United States Patent [19]

Krivoshlykov et al.

[11] Patent Number: 5,751,871
[45] Date of Patent: *May 12, 1998

[54] METHOD FOR COUPLING OF SEMICONDUCTOR LASERS INTO OPTICAL FIBERS

[75] Inventors: Sergej G. Krivoshlykov, Palmer, Mass.; Bolesh J. Skutnik, New Britain, Conn.

[73] Assignee: Ceram Optec Industries, Inc., East Longmeadow, Mass.

Related U.S. Application Data

[60] Provisional application No. 60/009,728, Jan. 5, 1996.

[21] Appl. No.: 775,947

[22] Filed: Jan. 3, 1997

[51] Int. Cl.[6] .................................................. G02B 6/32
[52] U.S. Cl. ........................... 385/33; 385/38; 385/385; 385/43; 385/36; 385/146; 65/387
[58] Field of Search ................................ 385/38, 33, 34, 385/35, 43, 36, 146; 65/387

[56] References Cited

U.S. PATENT DOCUMENTS

| | | | |
|---|---|---|---|
| 4,108,622 | 8/1978 | Martin | 65/387 |
| 4,703,175 | 10/1987 | Salour et al. | 250/227 |
| 5,011,254 | 4/1991 | Edwards et al. | 385/33 |
| 5,256,851 | 10/1993 | Presby | 385/33 |
| 5,446,816 | 8/1995 | Shiraishi et al. | 385/33 |
| 5,600,744 | 2/1997 | Takahashi | 385/33 |

OTHER PUBLICATIONS

K. Mathyssek et al. "Fabrication and Investigation of Drawn Fiber Tapers with Spherical Microlenses" J. Opt. Comm 6, 142–146 (1955).

U.C. Paek & A.L. Weaver "Formation of a Spherical Lens at Optical Fiber Ends with a $CO_2$ Laser" Appl. Opt. 14, 294–298 (1975).

P.K. Manhart, "Macro AGRIN Lenses for Optical Design Applications" Optics & Photonics News 6 44–47 (1995).

*Primary Examiner*—John Ngo
*Attorney, Agent, or Firm*—Bolesh J. Skutnik

[57] ABSTRACT

A method for efficiently coupling beams from semiconductor lasers into optical fibers is presented which provides optical fibers with a modified end surface for efficient coupling. The method comprises a combination of shaping of the fiber end face and of axially varying the refractive index of the fiber end face material as a function of the distance from fiber end face surface. One preferred embodiment employs an axial gradient-index lens (AGRIN lens) fabricated directly on the fiber end face to improve coupling a laser beam into the fiber. The method can also be used in other applications where optical fibers having spherical or more complicated surfaces of their end faces need to be fabricated.

15 Claims, 4 Drawing Sheets

METHOD FOR COUPLING OF SEMICONDUCTOR LASERS INTO OPTICAL FIBERS

BACKGROUND OF THE INVENTION

1. Domestic Priority Under 35 USC 119(e)

This application claims the benefit of U.S. Provisional Application Ser. No. 60/009728, filed Jan. 5, 1996.

2. Field of the Invention

The present invention relates to lasers and fiber optics and in particular to a new method for efficient coupling of laser beams into optical fibers. The method employs a combination of shaping of a fiber end face and axial varying of the refractive index of the fiber's material as a function of the distance from the fiber end face surface. One preferred embodiment employs an axial gradient-index lens (AGRIN lens) fabricated directly on the fiber end face to improve the coupling of a laser beam into the fiber. The method can also be applied in many other applications where optical fibers with spherical or more complicated surfaces of their end faces are to be fabricated.

3. Information Disclosure Statement

Optical fibers offer a convenient means to transfer laser power required in various applications. Many laser power delivery systems use compact and inexpensive laser diodes as a source of coherent radiation. A combination of high brightness beams delivered by optical fibers from each individual laser diode can provide a means for generating powerful output beams at various frequencies. Optical fiber fight delivery systems based, therefore, on semiconductor lasers have a potential to replace many different lasers currently used in industrial, medical and scientific applications.

A key point of the design of an optical fiber laser delivery system is efficient coupling of the laser beam into an optical fiber. The active region of a typical multimode semiconductor laser diode has a rectangular cross section having a size of 100–200 µm in one transverse direction and of 1–2 µm in the other transverse direction. Unfortunately, a beam irradiated by a semiconductor laser diode exhibits strong astigmatism having quite different angular divergences in the directions of the two transverse axes of the laser, typically of 20 and 40–60 degrees respectively. The corresponding numerical apertures are equal to 0.17 and 0.34–0.5. It is difficult to match the numerical apertures and cross section of such a beam to the numerical aperture and cross section of a typical optical fiber. Therefore, the diode laser beam can not be directly coupled into an optical fiber with good efficiency. Additional problems to be solved in the design of high power laser delivery systems are damage at optical interfaces and feedback resulting from undesired reflections from optical surfaces which can disrupt laser operation.

Matching a beam's numerical apertures and cross section of a laser to that of a fiber can be performed using different micro-optical systems including special cylindrical lenses made, for example, from a section of sapphire fiber. It is difficult, however, to transfer energy efficiently from the laser diode into an optical fiber through such micro-optical systems due to large aberrations of the system resulting from large non-paraxial angles of the laser beam rays, mode mismatches, and tight alignment tolerances. Moreover, the presence of additional optical surfaces between a laser and a fiber results in undesirable losses and feedback due to Fresnel reflection.

Another approach to the laser-fiber coupling problem is to fabricate a micro-lens directly on the fiber by shaping its end face to simplify the system and minimize the number of optical interfaces between laser and fiber. Known state of the art in fabricating spherical surface on the fiber end face comprises manufacturing a taper on the fiber end, cutting the taper at specific distance and melting its end to provide its spherical shape. (K. Mathyssek, J. Wittman, and R. Keil. "Fabrication and Investigation of Drawn Fiber Tapers with Spherical Microlenses", Journal of Optical Communications 6 142–146 (1985); C. A. Edwards and H. M. Presby, "Coupling of Optical Devices to Optical Fibers by Means of Microlenses", U.S. Pat. No. 5,011,254 (1991)). Heating with a focused beam of $CO_2$ laser can also be used to fabricate a spherical lens on a fiber end face (U. C. Paek and A. L. Weaver. "Formation of a Spherical Lens at Optical Fiber Ends with a $CO_2$ Laser", Applied Optics 14, 294–298 (1975)) as well as to form a more complicated asymmetric microlens on the fiber end faces which is better matched to laser geometry (H. M. Presby, "Microlenses for Coupling Optical Fibers to Elliptical Light Beams", U.S. Pat. No. 5,256,851 (1993)). This method, however, is very operator dependent and is difficult to control. It has a low reproducibility rate and does not provide a high quality spherical surface on the fiber end face.

There are other known methods of shaping a fiber end face based on polishing techniques. The method of polishing a fiber end face does not provide, however, a perfect shape on the fiber end surface because it is very difficult to control during the polishing procedure. Ideally a surface on the fiber end should have a hyperbolic shape in the direction corresponding to that of large beam divergence while a typical polishing technique provides a primarily spherical optical surface. Departure of the spherical surface from the desired hyperbolic surface results in spherical aberrations which become critical for strongly non-paraxial rays of the laser beam. Standard optics solves the spherical aberration problem by employing aspherical optical components. In general, however, it is extremely difficult problem to fabricate aspherical optical surfaces and accurately control their shapes even for standard lenses with macroscopic diameters. There are no methods for fabrication of aspherical lenses on the end face of an optical fiber having a core diameter sized as small as 8–600 µm.

Alternatively, standard optics also employs doublet or triplet optical systems which are designed to compensate for spherical aberrations. Additionally, axial variation of the refractive index may also be used to compensate aberrations. The variation of refractive index as a function of the distance from the lens surface is used, for example, in axial gradient-index lenses (AGRIN lenses) which have been demonstrated to be very effective in compensation of spherical aberrations. (P. K. Manhart, "Macro AGRIN Lenses for Optical Design Applications", Optics and Photonics News, 6, (3), 44–47 (1995).) In contrast to the case of a radial gradient lens, an axial gradient of the refractive index does not contribute to the focusing power of the lens. However, it can be used for corrections of spherical aberrations. The refractive index of an AGRIN lens is a function of the axial distance and each optical ray entering the spherical lens surface at different distances from the top of the lens encounters a different refractive index. This variation of refractive index contributes to a ray slope on the lens interface and can be used to exactly compensate the effect of spherical aberrations. On the macroscopic scale, diffraction-limited AGRIN lenses with much better performance than the best aspherical lenses and doublets have already become commercially available. The present invention has discovered a way to apply a similar approach to enhance coupling efficiency between a diode laser and a fiber having a shaped end face. In one preferred embodiment of the present invention an AGRIN micro-lens is fabricated directly onto the fiber end face.

OBJECTS AND SUMMARY OF THE INVENTION

It is an object of the present invention to provide a simple and efficient method of coupling a diode laser beam into an optical fiber by using a combination of shaping the fiber end face and of modifying the refractive index of the fiber end face material.

Another object is to provide efficient coupling of the diode laser beam into an optical fiber by fabricating a diffraction-limited AGRIN lens directly on the fiber end face.

A further object of the invention is to compensate for spherical aberrations of a shaped surface of the fiber end face by varying the refractive index of the fiber material so as to provide the same beam focusing properties like ideal hyperbolic surface when the fiber end face has a spherical surface.

An additional object is to reduce Fresnel reflection from the fiber end face and to improve laser damage resistance properties of the fiber end surface by axially varying the fiber's refractive index.

Another object of the invention is to provide optical fibers with a modified end surface to efficiently couple diode laser beam output including compensation for spherical aberrations and reduction of Fresnel reflections at the fiber end face.

Briefly stated, the present invention provides a method for efficiently coupling beams from semiconductor lasers into optical fibers and thus provides optical fibers with a modified end surface for efficient coupling. The method comprises a combination of shaping of the fiber end face and of axially varying the refractive index of the fiber end face material as a function of the distance from fiber end face surface. The method can also be used in many other applications where optical fibers having spherical or more complicated surfaces of their end faces need to be fabricated.

The above, and other objects, features and advantages of the present invention will become apparent from the following detailed description read in conjunction with the accompanying drawings.

BRIEF DESCRIPTION OF DRAWINGS

in FIG. 3.

DETAILED DESCRIPTION OF PREFERRED EMBODIMENTS

The present invention describes a new method for coupling a diode laser beam into an optical fiber which combines shaping the fiber end face and varying the refractive index of the fiber's end face as a function of the distance from the fiber end face's surface. A typical multimode laser diode has a cross section of its active strip equal to about 1–2 μm by 100–200 μm and beam numerical apertures (NA) of 0.34–0.5 by 0.17 respectively. It is not difficult to match a laser beam which has a dimension of 100–200 μm and a numerical aperture of 0.17 to an optical fiber having a numerical aperture of 0.1–0.2 and a fiber core diameter of 100–600 μm. Standard micro-optics can easily solve this problem. A laser beam with a very large divergence does create problems. For example, the capturing of a beam with a large numerical aperture (NA=0.34–0.5) by a small aperture fiber requires special coupling means. Since the size of laser beam in this direction (1–2 μm) is comparable with the lasing wavelength, such a laser strip can be considered as a point source having a large numerical aperture. From standard optics, it is well known that a divergent beam from such a point source can be transformed into a parallel beam if the source is placed at a focal point of a lens having a hyperbolic surface.

Figure 1:
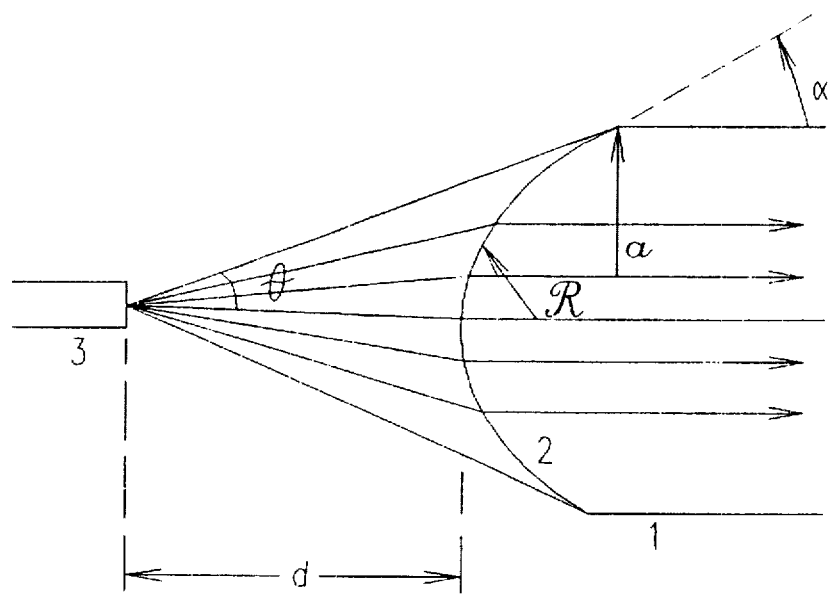
FIG. 1 shows an optical fiber end face having an optimum hyperbolic shape.

FIG. 1 shows one preferred embodiment of the present invention where fiber end face 1 is shaped in one transverse direction to have a hyperbolic-like surface 2. Angle α determining asymptotic behavior of the hyperbolic surface must be chosen to be larger than angle Θ which characterizes the divergence of the laser beam in that traverse direction. Distance d between laser 3 and fiber end face 1 and radius R of hyperbolic surface 2 should be chosen in such a way as to provide effective coupling of the laser beam into a fiber core having radius a.

Figure 2:
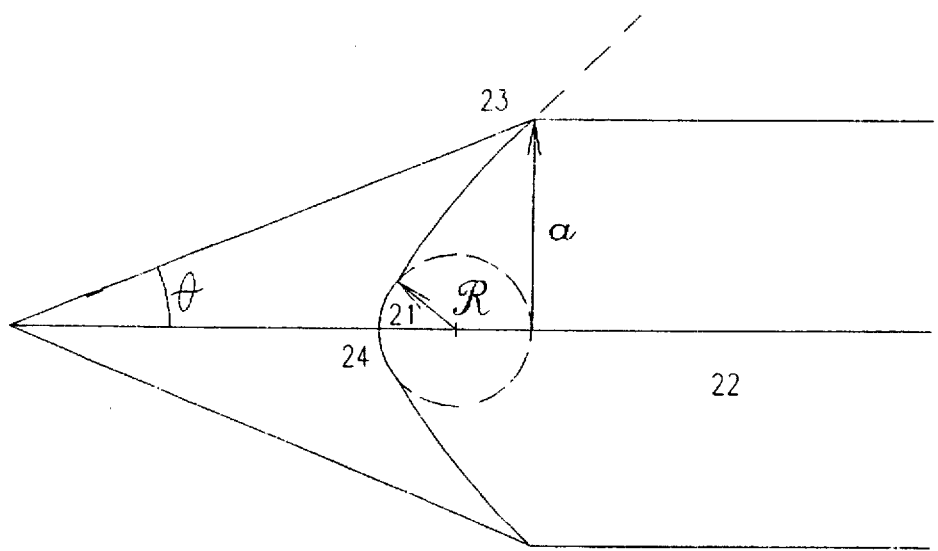
FIG. 2 shows an optical fiber end face having an essentially spherical shape to approximate the optimum hyperbolic surface.

Unfortunately, it is almost impossible to fabricate a fiber having an exact hyperbolic surface of its end face. It is very difficult to solve this problem even for standard macro-optics. Therefore, the optimum hyperbolic surface must be approximated by a more realistic surface which can be fabricated using existing technologies. One possible approach to this approximation would be to fabricate a round cylindrical lens 21 of radius R directly onto fiber end face 22, as shown in FIG. 2. Such a lens approximates very well the hyperbolic cylindrical surface of fiber 23 in its central region. However, for rays propagating under large angles Θ, the departure of round cylindrical surface 21 from optimum hyperbolic surface 23 becomes large resulting in spherical aberrations in the system. These spherical aberrations can be compensated for by creating a gradient of refractive index along axis z of the system. This results in an axial gradient-index lens being fabricated directly onto the fiber end face. The refractive index of the fiber material should usually be larger in fiber tip region 24 and decreases as a function of the distance z. Since rays propagating under larger angle Θ will pick up smaller refractive index of the at the fiber interface, round surface 21 of cylindrical lens can exhibit similar optical focusing properties to those of optimum hyperbolic surface 23 in the case of uniform refractive index in the fiber material. Desired axial gradient of refractive index in fiber material in the vicinity of a fiber end can be fabricated using standard technologies, such as ion exchange, sol-gel, glass fusion, chemical vapor deposition, neutron irradiation, etc.

The approximation of an optimum hyperbolic surface by an axial gradient-index spherical lens made on the fiber end face is an especially efficient solution of the problem in the case of coupling a beam of a single-mode diode laser into a single-mode fiber having a relatively small core cross section. An active region of a typical semiconductor laser diode has a size of 0.1–0.2 μm in one transverse direction and 2 μm in other transverse direction. The beam irradiated by the semiconductor laser diode exhibits a strong astigmatism having quite different angular divergences of 30–40 and 10–15 degrees in the directions of the two respective transverse axes of the laser. Corresponding numerical apertures are equal to 0.25–0.34 and 0.08–0.13. A typical single-mode fiber has a core diameter of 10 μm and a numerical aperture of 0.2. Therefore, in one direction it is not difficult to match the size and numerical apertures of such a beam to a core cross section and numerical aperture of a single-mode optical fiber. However, in order to achieve a good coupling efficiency in the second traverse direction, the diode laser having rather large numerical aperture (0.25–0.34) should be placed very close to the fiber end face. Under such conditions, only a central part of hyperbolic surface 23, i.e. a few μm, which is approximated in FIG. 2 with spherical surface 21 of radius R, is responsible for the coupling of a laser beam into fiber 22. Therefore, compensation of aberrations of spherical surface 21 by employing an axially varying refractive index of the fiber material as described above is a very efficient means of enhancing coupling efficiency between a single-mode semiconductor laser and an optical fiber.

Figure 3:
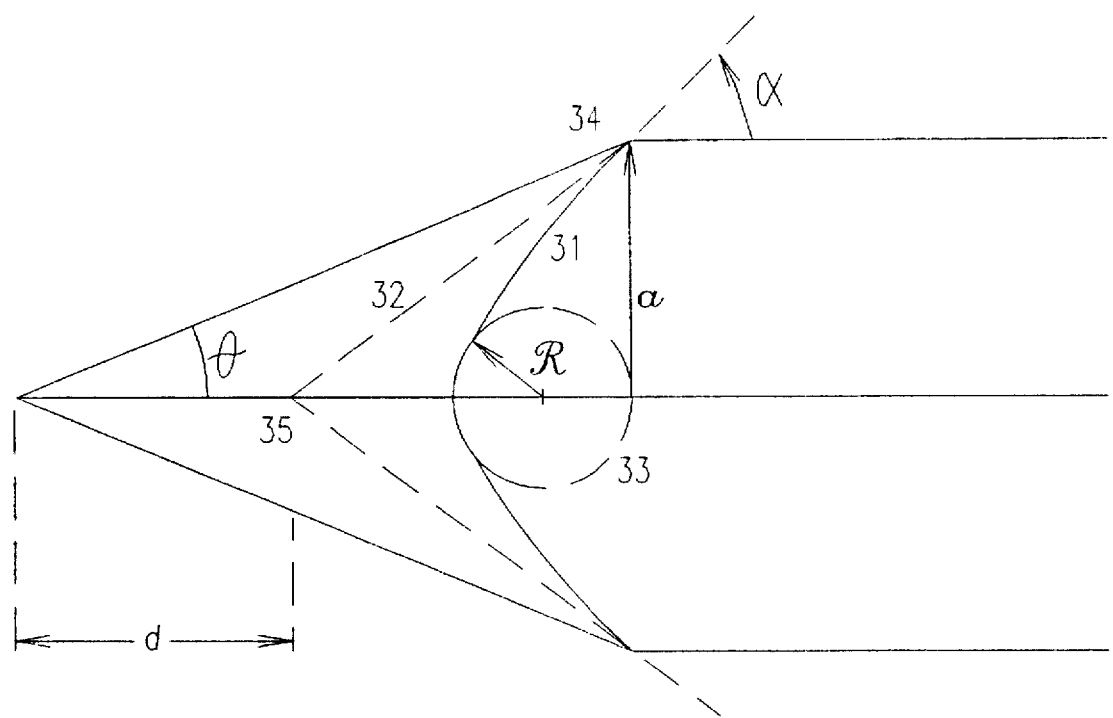
FIG. 3 shows an optical fiber end face having a prism-like shape.
Figure 4:
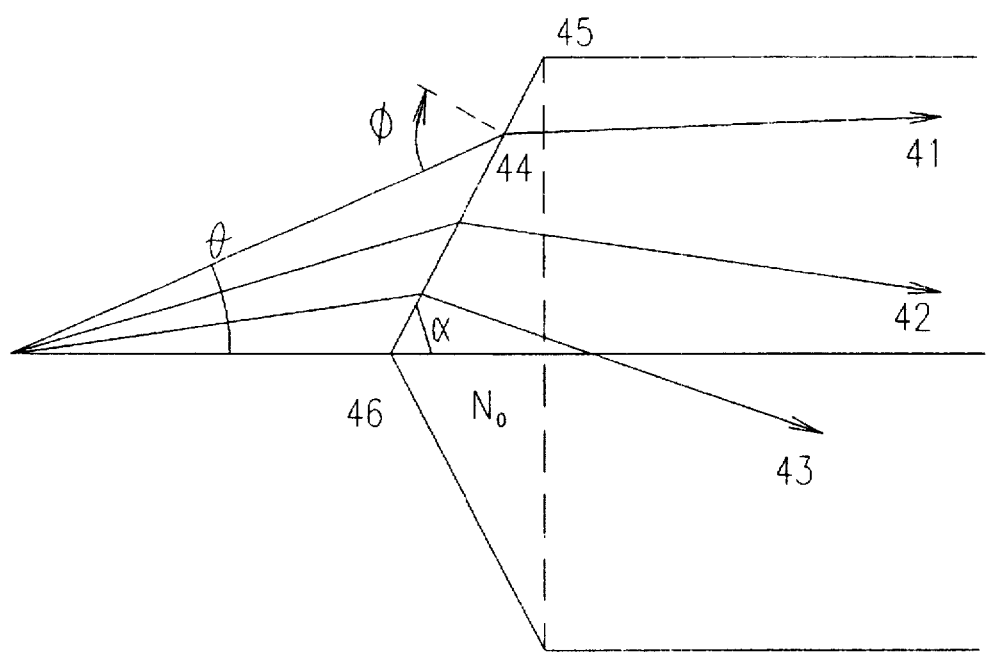
FIG. 4 shows laser beam rays propagating through a prism-like end face of an optical fiber, as e.g.

In the case of a multimode laser diode and a multimode fiber, however, the situation is quite different. Typically a multimode fiber has a core diameter of 100–600 μm and the distance between fiber end face and laser can be more than 50 μm. Such a case is illustrated in FIG. 3. Radius R of optimum hyperbolic surface 31 is much smaller than fiber core cross section a allowing capture of the laser beam having sufficiently large divergence angle Θ. In this case it is more preferable to approximate hyperbolic cylindrical surface 31 with prism-like surface 32 rather than with a spherical surface 33. Such a fiber end face having prism-like surface 32 with given characteristic angle α can be easily fabricated using a fiber polishing technique. Prism-like surface 32 approximates optimum hyperbolic surface 31 of the fiber very well in the region near base of the prism 34. In apex region 35, the departure of prism surface 32 from optimum hyperbolic surface 31 causes deterioration in its beam focusing performance. This is illustrated in FIG. 4. Ray 41 entering the shaped fiber end face near the base region 45 of the prism propagates parallel to fiber axis z. Ray 42 in central region of the prism propagates under certain angle to the fiber axis, but still guided by the fiber. Ray 43 entering the prism near apex region 46 propagates under such large angles that it can not be guided by the fiber having a small numerical aperture. In order to catch all the rays in the apex region of the prism the numerical aperture (NA) of the fiber must obey the following equation:

$$NA \geq n \sin^{-1}[90 - \alpha - \sin^{-1}(\cos \alpha/n)] \quad (1)$$

where n is refractive index of the fiber core material and α is prism angle.

Many laser diodes have angle Θ of about 40 degrees. Therefore, prism angle α can not be smaller than 58 degrees. Otherwise beam rays striking fiber end interface 44 under too large angles (φ) will have very large Fresnel reflection resulting in additional losses of laser beam power. In the case when fiber core is made from fused silica having refractive index $n = n_0 = 1.46$, numerical aperture (NA) of the fiber must be larger than 0.27 to capture all the central rays. Typically silica/silica optical fibers used in laser systems have a numerical aperture less than 0.2, and many optical fiber laser delivery systems employ fibers with even a smaller numerical aperture (0.12–0.14). Such applications therefor require a special means to improve efficiency for coupling of a laser beam into an optical fiber.

Figure 5:
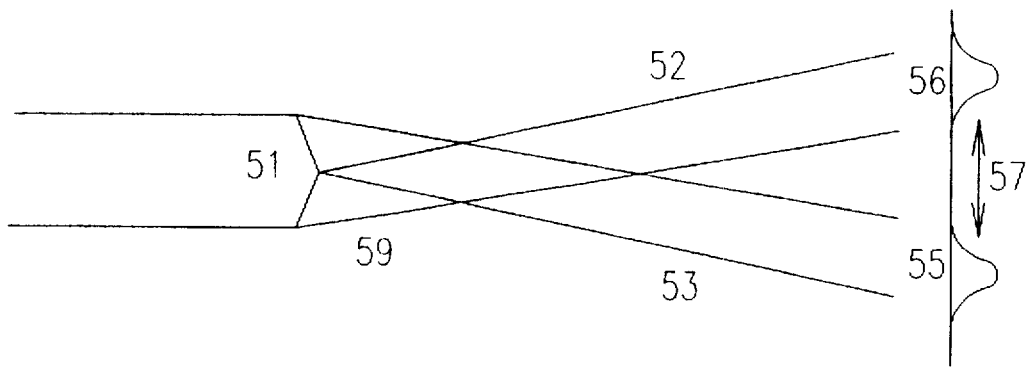
FIG. 5 illustrates the far field intensity distribution of a beam irradiated by a shaped fiber end face.

In one preferred embodiment, to improve the beam coupling efficiency one can shape apex region 46 of the prism so as to fabricate a round surface of certain radius R approximating an optimum hyperbolic cylindrical surface. This can be performed using a fiber polishing technique. Since fiber polishing is very operator dependent, this procedure requires an effective means to control radius R of the resulting surface. A way to maintain such a control during the polishing procedure is to excite the fiber through its distal end with a laser beam, such as a beam from He—Ne laser, and then monitor the far field intensity distribution of the beam exiting the shaped fiber end. The intensity distribution can be detected either electronically, using, for example, photodetector or CCD camera, or visually by direct observation of the far field intensity distribution on a screen. FIG. 5 shows a prism-like shaped fiber end face 51 radiating two mutually crossing beams 52 and 53 which are projected on screen 54 as two nonoverlapping bright spots 55 and 56. Dark region 57 between these two spots becomes filled with light as apex region 59 of shaped fiber end face 51 is polished. A perfect shape of the fiber end face corresponds to the case when regions 55, 56, and 57 all have approximately equal intensities. This is a criterion indicating that fiber polishing procedure is completed.

Figure 6:
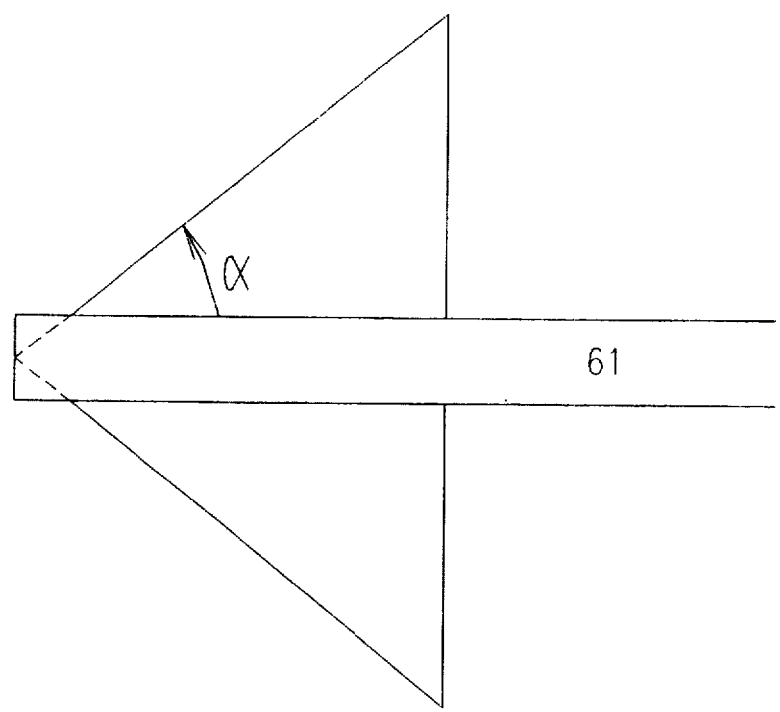
FIG. 6 illustrates a tool for polishing a fiber end face.

The fiber polishing technique described above is a very operator dependent and time dependent procedure which requires special skills. Therefore, it would be desirable for many practical applications to deal with fibers having a simpler shape of their end face such as a prism-like shape which can be more easily fabricated in a reproducible manner. For example, a fiber end face can be polished to a prism-like shape using a special prism-like tool as shown in FIG. 6. This tool has channel 61 to hold the fiber. Angle α of this prism-like tool corresponds to the desired angle of the prism to be made on the fiber end face.

Figure 7:
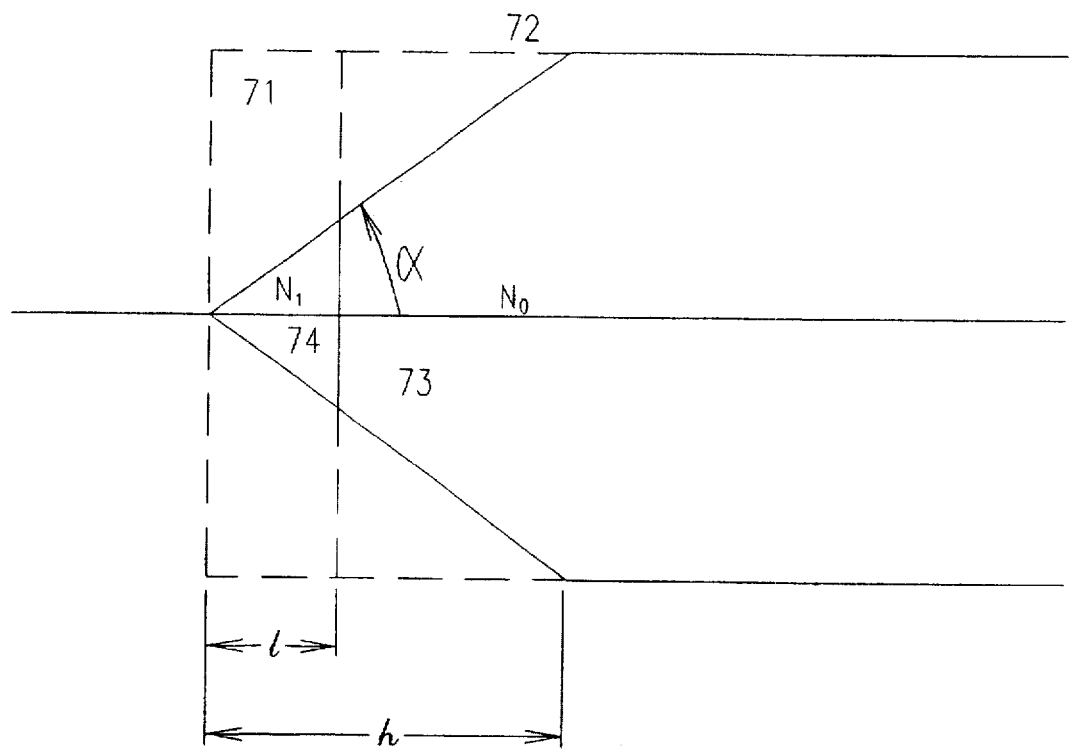
FIG. 7 shows a prism-like optical fiber end face having a low refractive index in its apex region.

It follows from equation (1) that another way to decrease a fiber's numerical aperture is to decrease the refractive index of the fiber core material at the prism apex region. The lower index material will decrease angles of paraxial rays coupled into the fiber. Therefore the laser beam can be efficiently coupled into the fibers having lower numerical aperture. In one preferred embodiment, shown in FIG. 7, one can first deposit material 71 having a refractive index, $n_1 < n_0$, directly on fiber end face 72 and then simply polish the fiber end face to a prism-like shape as shown in FIG. 7. Thickness d of this lower refractive index layer 71 should be less than height h of prism-like end 73 of the fiber. For example, with a typical fiber having numerical aperture NA=0.2 and end face angle α=58°, refractive index of apex region 74 of prism-like end face 73 should be $n_1 = 1.36$. In the case of fibers having numerical aperture as low as NA=0.14, the refractive index of the apex region should be approximately $n_1 = 1.23$. To achieve such values, one can employ, for example, optical materials used for antireflecting coatings. They can also be fabricated using sol-gel technology. Porous glasses deposited on the fiber end face exhibit the desired low refractive index.

Moreover, the low index layer in the prism apex region is also useful for reducing Fresnel reflection of the laser beam from the fiber end face. It is known, that lower index antireflecting coating layers having plane surface result in considerable reduction of the reflection if thickness of the layer corresponds to an odd number of quarters of wavelength and its refractive index is equal to $n_1 = (n^0)_{1/2}$, where $n_0$ is refractive index of a substrate material. Therefore, prism-like apex region 74 of fiber end face 73 having refractive index close to $n_{1=(n0)}^{1/2}$ and appropriate thickness 1 can also reduce Fresnel reflection from the fiber end face. In the case of a fused silica core fiber, $n_0=1.46$, and the refractive index of the antireflecting layer should be close to $n_1=(1.46)^{1/2}=1.21$. Standard antireflecting coating materials, such as $MgF_2$, routinely used in optics can be employed for fabrication of the low index apex region of the prism-like fiber end face. It follows from equation (1) that in the case of prism angle $\alpha=58°$ and refractive index of the apex region $n=n_1=1.21$, one gets efficient coupling of the diode laser beam even into a fiber having numerical aperture as low as 0.13.

The procedure for fabricating the shaped fiber end face described above is quite straightforward. One should first deposit a low refractive index layer of appropriate thickness on the fiber end face and then polish the fiber end face in tool shown in FIG. 6 to provide its prism-like shape.

Figure 8:
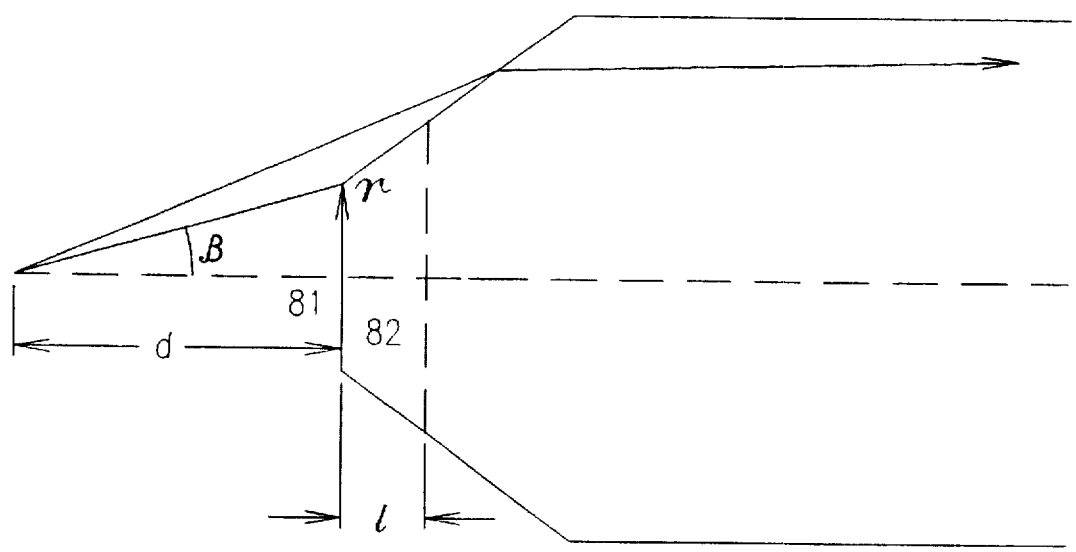
FIG. 8 shows a prism-like fiber end face having cut apex region.

In another preferred embodiment one can cut the apex region of the prism-like end face of the fiber as shown in FIG. 8 in order to capture all paraxial rays of the laser beam within fiber's numerical aperture. Radius r of the cut region and its distance d from the laser diode are determined by the following:

$$\beta=\sin^{-1}(NA)=\tan^{-1}(r/d) \quad (2)$$

where $\beta$ is the maximum angle of paraxial rays to be captured by central region 81 of the fiber and NA is the fiber numerical aperture. To reduce Fresnel reflection from the cut fiber end face, either one can use a material for coating 82 with the optimum low refractive index to reduce Fresnel reflections or one can also deposit an appropriate quarter wavelength antireflecting on the fiber end face before the polishing and cutting procedure.

Having described preferred embodiments of the invention with reference to the accompanying drawings, it is to be understood that the invention is not limited to these precise embodiments, and that various changes and modifications may be effected therein by one skilled in the art without departing from the scope or spirit of the invention as defined in the appended claims.

What is claimed is:

1. A method of coupling a diode laser beam into an optical fiber having a core with a refractive index and a cladding with a lower refractive index, said method comprising the steps of:

modifying said core's refractive index at a fiber end face surface thereby creating an axial variation of said core's refractive index as a function of the distance from said fiber end face surface; and shaping said fiber end face so as to maximize coupling efficiency of said diode laser beam into said fiber.

2. A method of coupling a diode laser beam into an optical fiber of claim 1, further comprising a step of controlling focusing properties of said shaped fiber end face surface during its fabrication.

3. A method of coupling a diode laser beam into an optical fiber of claim 2, wherein said controlling step is performed during said shaping step and comprises the additional steps of:

exciting said fiber at its distal end with a laser source, including a He—Ne laser; and monitoring the far field distribution of the beam irradiated by said shaped fiber end face using standard means of observation including electronic and nonelectronic detection of an intensity distribution on a screen.

4. A method of coupling a diode laser beam into an optical fiber of claim 1, wherein the step of modifying said core's refractive index involves fabricating an axial gradient-index lens having spherical surface directly on said fiber end face.

5. A method of coupling a diode laser beam into an optical fiber of claim 4, wherein the step of creating said variation of refractive index along said fiber's axis involves fabricating an approximate refractive index distribution which is a linear function of distance from an outermost point of said fiber end face surface.

6. A method of coupling a diode laser beam into an optical fiber of claim 1, wherein the step of shaping said fiber end face involves fabricating a prism directly onto said fiber end face.

7. A method of coupling a diode laser beam into an optical fiber of claim 6, wherein Fresnel reflection from said fiber end face is minimized by fabricating said prism with its apex region having a lower refractive index than its base region.

8. A method of coupling a diode laser beam into an optical fiber of claim 7, wherein the step of varying refractive index along said fiber's axis involves a step-like distributing onto said fiber end face at least one layer having a refractive index which differs from that of said fiber core material.

9. A method of coupling a diode laser beam into an optical fiber of claim 6, further comprising a step of cutting said prism's apex region to provide for capturing of paraxial rays of the laser beam into numerical aperture of said fiber.

10. A method of coupling a diode laser beam into an optical fiber of claim 9, wherein Fresnel reflection from said fiber end face is minimized by fabricating onto said fiber end surface said prism with its cut apex region having a lower refractive index than its base region.

11. A method of coupling a diode laser beam into an optical fiber of claim 1, wherein the step of creating said variation of refractive index along said fiber's axis involves using layers of low index antireflecting coating optical materials, including $MgF_2$.

12. A method of coupling a diode laser beam into an optical fiber of claim 1, wherein the step of creating said variation of refractive index along said fiber's axis involves fabricating a modified refractive index of said fiber core material at said fiber end surface by a process selected from the group of Sol-Gel techniques, Ion Exchange, Chemical Vapor Deposition, Glass Fusion, and Neutron Irradiation.

13. A modified optical fiber end surface for enhanced coupling with diode laser beams comprising:

an optical fiber having a core with a refractive index and a cladding with a lower refractive index;

a fiber end face surface, to accept a diode laser beam;

said fiber end face surface having an axial variation of said core's refractive index that varies as function of distance from said fiber end face surface; and said fiber end face surface being shaped so as to maximize coupling efficiency of said diode laser beam into said fiber.

14. A modified optical fiber end surface according to claim 13, wherein said axial variation of said core's refractive index is created by a process selected from the group of Sol-Gel techniques, Ion Exchange Chemical Vapor Deposition, Glass Fusion, and Neutron Irradiation.

15. A modified optical fiber end surface according to claim 13, wherein said axial variation of said core's refractive index has a step-like distribution comprising at least one layer having a refractive index which dose not coincide with that of the fiber core material.

* * * * *